United States Patent [19]
Brenner

[11] Patent Number: 6,066,184
[45] Date of Patent: May 23, 2000

[54] VOLTAIC CELL

[75] Inventor: Rolf Brenner, Ellwangen, Germany

[73] Assignee: Varta Batterie Aktiengesellschaft, Hannover, Germany

[21] Appl. No.: 08/950,189

[22] Filed: Oct. 14, 1997

[30]    Foreign Application Priority Data

Nov. 18, 1996 [DE]    Germany .............................. 196 47 593

[51] Int. Cl.⁷ .............................. H01M 6/00; H01M 2/08
[52] U.S. Cl. ........................ 29/623.2; 29/623.1; 429/171; 429/185
[58] Field of Search ........................... 429/157, 171–174, 429/185; 29/623.1, 623.2

[56]            References Cited

U.S. PATENT DOCUMENTS

| | | |
|---|---|---|
| 3,440,110 | 4/1969 | Arbter . |
| 3,748,182 | 7/1973 | Brown . |
| 4,220,695 | 9/1980 | Ishida et al. . |
| 4,327,165 | 4/1982 | Kuhl ........................................ 429/174 |
| 4,333,995 | 6/1982 | Ishida et al. . |
| 4,404,266 | 9/1983 | Smilanich . |
| 4,419,420 | 12/1983 | Ishizaki . |
| 5,728,484 | 3/1998 | Yamaguchi et al. ...................... 429/35 |

FOREIGN PATENT DOCUMENTS 31 13 309   10/1982   Germany .

Primary Examiner—Maria Nuzzolillo
Assistant Examiner—Tracy Dove
Attorney, Agent, or Firm—Schnader Harrison Segal & Lewis LLP; Gerard J. Weiser

[57]            ABSTRACT

In a voltaic cell, especially in the form of a button cell, with a metal housing sealed liquid-tight including a cell cup and a cell lid electrically insulated against it by a seal, the seal is formed from a sealing part produced by deep drawing from a plastic film. This sealing part is shrink-fitted onto the edge of the cell lid. To produce the voltaic cell, a sealing part is formed by deep drawing from a plastic film, which sealing part is subsequently placed on the edge of the cell lid, shrink-fitted onto the edge of the cell lid and the cell cup is flanged around it.

12 Claims, 2 Drawing Sheets

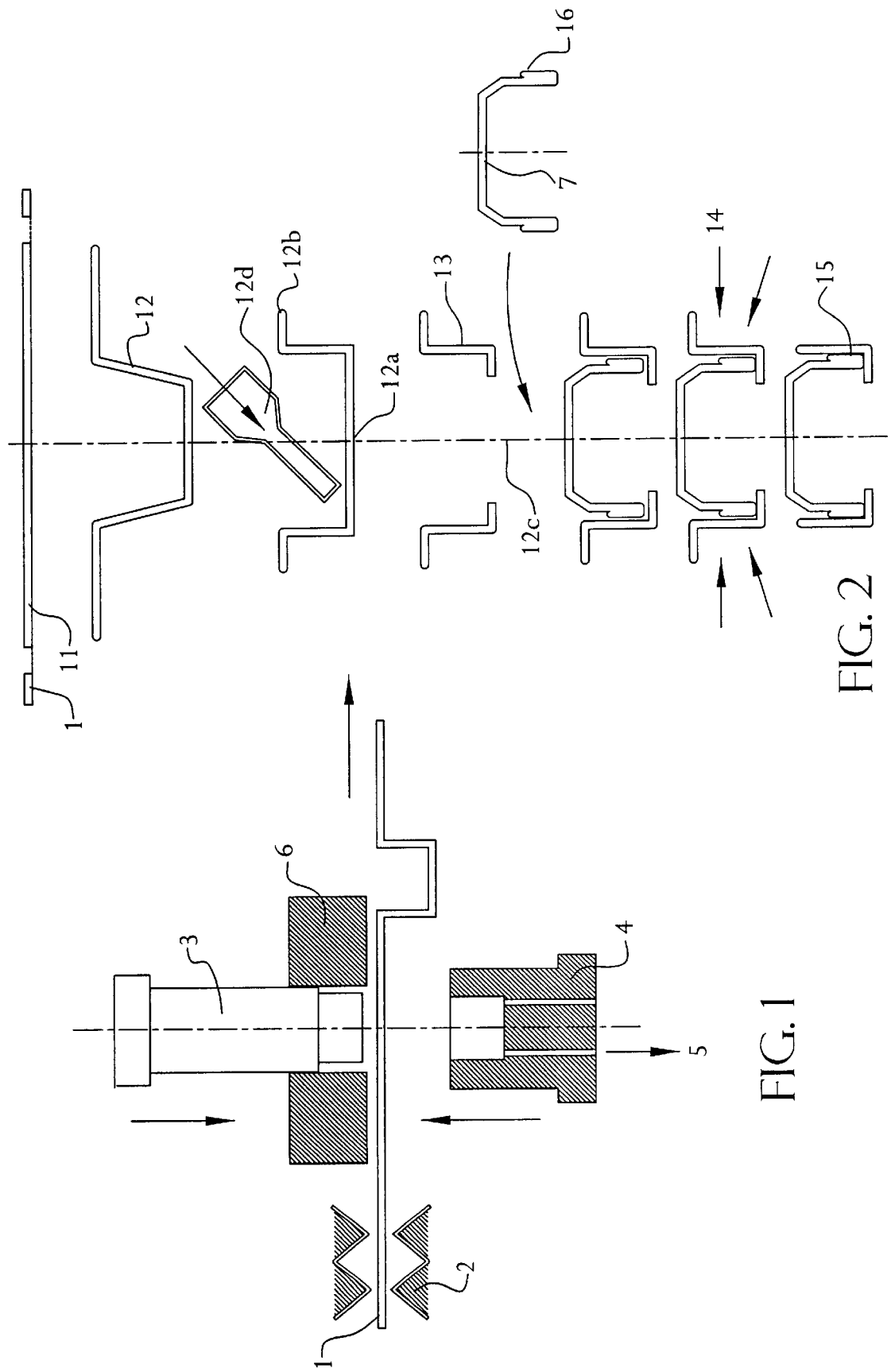

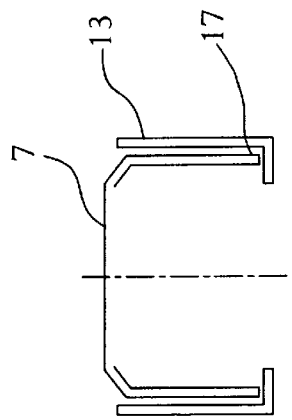
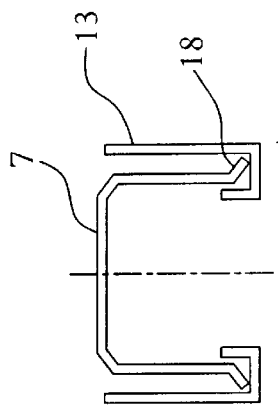
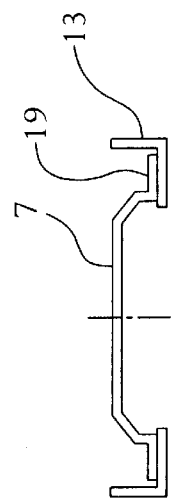
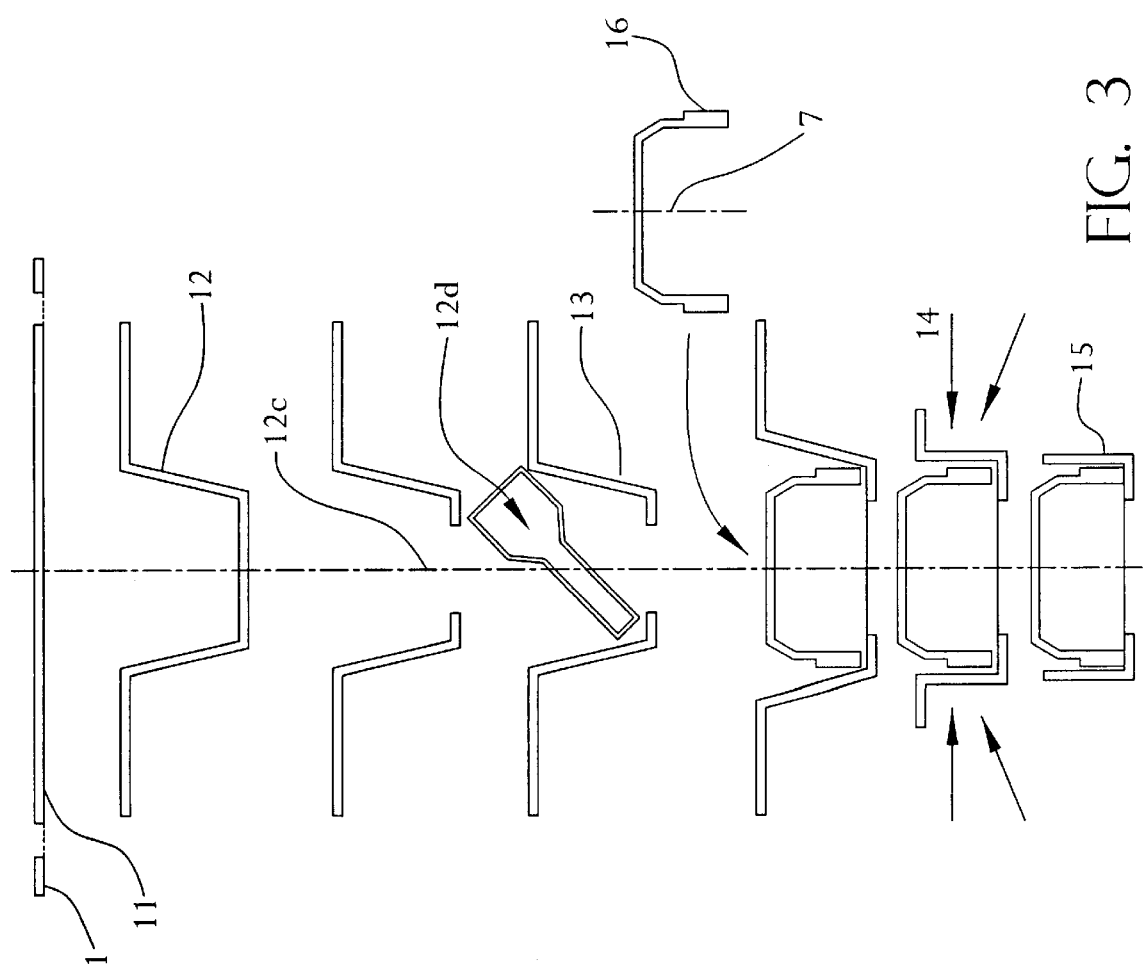

VOLTAIC CELL

BACKGROUND OF THE INVENTION

1. Field of the Invention

The invention relates to batteries, and, in particular, to button cells.

2. Description of the Related Art

Voltaic cells, especially in the form of button cells, consist of a housing cup and a lid. The housing cup is manufactured, for example, from nickel-plated deep-drawn sheet metal as a stamped part. Ordinarily, the housing cup is the positive pole and the lid is the negative pole. Such button cells may contain a great variety of electrochemical systems, such as nickel/cadmium, nickel/metal hydride, or a variety of primary systems such as zinc/$MnO_2$ or primary and secondary lithium systems.

The liquid-tight sealing of such cells is accomplished by flanging the edge of the cup over the edge of the lid; in this case, a plastic ring serves as both a sealing ring and as insulation of the cup against the lid. Such button cells are known, e.g., from German Patent DE-OS 3113309.

The sealing elements required for these button cells are produced by the injection molding process, e.g., from polyamides. The injection tools required for this process are very costly. In addition, it is practically impossible to produce sealing elements with walls of a thickness of less than 0.3 mm by the injection molding process so that the known seals, especially in the case of very small button cells, require a relatively large volume and therefore limit the utilization of the cell capacity.

SUMMARY OF THE INVENTION

The invention has the objective of devising a simply produced and reliable cell seal and a process for manufacturing said seal.

According to the invention, a cup is drawn from a heated film using a deep drawing die and a molding stamp under a vacuum. Depending on the diameter/height ratio, the deformation is performed in one or more graduated working processes similar to the deep drawing process for shaping sheet metal. The bottom region of the cup produced by deep drawing is stamped out by a conventional cutting technique using a cutting stamp and a cutting bushing at a separate work station following the deep drawing. Depending on the setting of the process parameters, very uniform wall thicknesses can be achieved at seal heights between 0.8 and 5 mm. For instance, if a film thickness of 0.15 mm is used, a wall thickness of about 0.12 mm can be achieved. Polyamides are preferably used as the material of the films, with the material thicknesses advantageously lying in the range from 0.1 to 0.3 mm.

BRIEF DESCRIPTION OF THE DRAWINGS

Other aspects, features, and advantages of the present invention will become more fully apparent from the following detailed description, the appended claims, and the accompanying drawings in which:

FIG. 1 shows a procedure for manufacturing cup-shaped sealing parts for voltaic cells, according to one embodiment of the present invention;

FIGS. 2–3 show procedures for forming and mating a sealing part to a lid of a voltaic cell, according to two embodiments of the present invention; and FIGS. 4–6 show different configurations of sealing parts and lids for voltaic cells, according to the present invention.

DETAILED DESCRIPTION

As shown in FIG. 1, the polyamide film 1 with a material thickness from 0.1 up to 0.3 mm is guided through a heated segment 2 to where it is heated up to about 100–120° C. Following this, using a molding stamp 3 with stripper center rest 6 and the drawing die 4 an applying a vacuum 5 of from 0.1 up to 0.8 bar, a cup-shaped sealing part is formed. The deformation may be performed, depending on the desired diameter-to-height ratio, in one or more graduated working processes.

As illustrated schematically in FIG. 2, for instance, it is provided that a disk 11 is cut out of the film 1 in a first operating step and then from it, in a first drawing process, a cup 12 is drawn, and the cup 12 is profiled in a second drawing process 12a. If necessary, an inner coating 12d may be applied in the cup with an adhesive, such as polyamide grease, in order to improve the sealing.

Following this, an opening 12c is cut out in the bottom of the cup by a cutting stamp so that a preformed sealing element 13 results. This sealing element is mounted on the lid 7 of the button cell. After this, the cell lid is inserted into the housing cup and the parts are flanged together in a liquid-tight manner. The cell lid 7 may, for example, be fabricated from a nickel-plated deep-drawn metal sheet or a bi-metal or tri-metal. The lower edge of the cell lid is folded over at 16 as is customary.

It is especially advantageous to shrink-fit 14 the preformed sealing element or sealing molding onto the cell lid 7 which can be done, e.g., with the material polyamide by heat-treating it at a temperature from 100 to 120° C. Following this, the upper part 12b of the preformed sealing element can be trimmed so that the cell lid after this process is provided with a shrink-fitted L-shaped seal 15. If necessary, the film material may also be a multilayered material.

As shown in FIG. 3, a cone-shaped sealing element 12 is mounted on the cell lid 7 of the button cell. As a result, simple mounting is possible without damaging the sealing element when inserting the cell lid. Then the sealing element is shrink-fitted onto the cell lid.

As shown in FIG. 4, a cell lid 7 is used whose bottom part 17 is not folded as in FIGS. 2 and 3. This design of the cell lid 7 increases the interior volume of the cell. During shrinking, the bottom part of the sealing element wraps around the cut edge 17 of the cell lid 7 and is closely joined to said cut edge. Thus, in cells with alkaline electrolyte, the electrolyte cannot contact the cut edge of the cell lid and lead to the evolution of hydrogen in the cell.

In the variant shown in FIG. 5, the lower region 18 of the cell lid 7 is shaped in such a way that the cut edge of the cell lid 7 points outward. As a result, this cut edge can be protected by the sealing element 13 even better against contact with the alkaline electrolyte.

When the lids shown in FIGS. 4 and 5 are used, relatively thin material can be used for the lid 7, because, during the assembly of the sealing element according to the invention, scarcely any forces occur that could deform the lid. As opposed to this, during the assembly of a conventional sealing ring, significantly greater forces occur since it is necessary to seat the lid very firmly in the seal to prevent the electrolyte from contacting the cut edge of the lid or leaking out of the cell.

In FIG. 6, the use of a sealing element according to the invention in a button cell is shown where the lower edge 19 of the lid 7 standing to the outside is shrink-enclosed by the sealing element. The flanged edge of the cup clamps this edge in.

One particular advantage of the seal according to the invention derives from the fact that a uniform homogeneous sealing lip is formed which, in contrast to the seals produced by the injection molding process, has no casting gate. Costly injection molding tools are dispensed with and the material is optimally utilized. Because of the small volume of a seal according to the invention, a higher utilization of the capacity of the button cells is possible. Due to the fact that the seal is shrink-fitted onto the cell lid, no stresses arise between the lid and the seal. Seals produced by the injection molding process, in contrast, require a conditioning which consists of storing the seals in a moist atmosphere for a defined time interval, such as seven days, so that the seals become sufficiently elastic that they can be joined to the lid flawlessly, which step can be omitted in the case of the cells according to the invention.

In particular, it is possible with the process according to the invention to fabricate very thin-walled sealing elements having thicknesses less than 0.3 mm and that cannot be produced by injection molding techniques.

It is possible to preform a sealing element in the form of a cup in a continuous fabrication process from a plastic film, to stamp out the bottom, to coat the film, then to insert the lid and shrink the film onto the lid, and the lid can then be further fabricated directly on an assembly line. When injection-molded sealing rings are used, in contrast, they must first be prefabricated, tested, and conditioned. Then the sealing rings, which are transported and stored as bulk goods, are arranged in a position-oriented manner in a costly process and then mounted on the lids.

During the production of button cells of different dimensions, the adaptation of the tools to the sealing element according to the invention is much simpler than refitting injection-molding tools for the sealing rings. The rewording of these injection-molding tools is also much more costly than in the case of the simple tools required for the sealing element according to the invention.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A process for the production of a voltaic button cell having a liquid-tight sealed metal housing, comprising the steps of:

heating a polyamide film of a thickness from 0.1 to 0.3 mm to a temperature of about 100–120° C., deep drawing the heated polyamide film under a vacuum and forming a cup-shaped sealing part for the button cell, cutting out an opening in the bottom of the cup, thereby forming a sealing element, mounting the sealing element on the lid of a button cell, and inserting the cell lid into a housing cup, flanging the cell lid and the housing cup together in a liquid tight manner such that said sealing part insulates the cell-lid from the housing cup, and separating the button cell from the apparatus, thereby obtaining the cell.

2. The process of claim 1, wherein the mounting of the sealing element on the lid of the button cell comprises shrink-fitting the heated preformed sealing element into the cell lid.

3. The process of claim 1, which comprises trimming the upper part of the preformed sealing element, thereby providing the cell lid with a shrink-fitted L-shaped seal.

4. The process of claim 1, wherein the polyamide film is multilayered.

5. The process of claim 2, which comprises folding over the lower edge of the cell lid prior to flanging the cell lid and the housing cup together.

6. The process of claim 2, wherein the lower edge of the cell lid is not folded over when flanging the cell lid and the housing cup together, thereby maximizing the interior volume of the cell and during the shrink-fitting, the bottom part of the sealing element wraps around and is closely joined to the cut edge of the cell lid, thereby avoiding contact between the cut edge of the cell lid and alkaline electrolyte.

7. The process of claim 2, wherein the polyamide film has a thickness between 0.1 and 0.3 mm.

8. The process of claim 2, wherein the sealing element height is between 0.8 and 5 mm.

9. The process of claim 8, wherein the polyamide film has a thickness of 0.15 mm and the sealing element has a wall thickness of about 0.12 mm.

10. The process of claim 2, wherein the lower region of the cell lid is shaped so that the cut edge of the cell lid points outward, thereby improving protection by the sealing element against contact with alkaline electrolyte.

11. The process of claim 2, wherein the polyamide film from which the sealing element is formed is not subjected to preconditioning in a moist atmosphere to impart elasticity thereto.

12. The process of claim 2, wherein the sealing element is preformed from the polyamide film into a cup in a continuous fabrication process.

* * * * *